(12) United States Patent
Kwak

(10) Patent No.: US 12,499,921 B2
(45) Date of Patent: Dec. 16, 2025

(54) DIVIDED CLOCK CONTROL

(71) Applicant: Micron Technology, Inc., Boise, ID (US)

(72) Inventor: Jongtae Kwak, Allen, TX (US)

(73) Assignee: Micron Technology, Inc., Boise, ID (US)

(*) Notice: Subject to any disclaimer, the term of this patent is extended or adjusted under 35 U.S.C. 154(b) by 80 days.

(21) Appl. No.: 18/590,760

(22) Filed: Feb. 28, 2024

(65) Prior Publication Data

US 2024/0321332 A1 Sep. 26, 2024

Related U.S. Application Data

(60) Provisional application No. 63/492,101, filed on Mar. 24, 2023.

(51) Int. Cl.
*G11C 7/22* (2006.01)
*G11C 8/18* (2006.01)
*H03L 7/081* (2006.01)
*H03K 19/20* (2006.01)

(52) U.S. Cl.
CPC ............ *G11C 8/18* (2013.01); *G11C 7/222* (2013.01); *H03L 7/0812* (2013.01); *H03K 19/20* (2013.01)

(58) Field of Classification Search
CPC .................................. G11C 7/22; G11C 8/18
USPC ....................................................... 365/233.1
See application file for complete search history.

(56) References Cited

U.S. PATENT DOCUMENTS

| 6,393,504 | B1* | 5/2002 | Leung | G06F 13/40 |
| | | | | 712/15 |
| 7,167,527 | B1* | 1/2007 | Park | H04L 25/4923 |
| | | | | 375/295 |
| 8,169,851 | B2* | 5/2012 | Chou | G11C 7/222 |
| | | | | 365/233.13 |
| 10,049,177 | B1* | 8/2018 | Devlin | G06F 30/396 |
| 10,063,234 | B1* | 8/2018 | Mazumder | H03K 19/017509 |
| 2010/0302835 | A1* | 12/2010 | Mihnea | G11C 8/18 |
| | | | | 365/230.06 |
| 2011/0239031 | A1* | 9/2011 | Ware | G06F 13/1689 |
| | | | | 713/500 |

* cited by examiner

*Primary Examiner* — Muna A Techane
(74) *Attorney, Agent, or Firm* — Holland & Hart LLP

(57) ABSTRACT

Methods, systems, and devices for divided clock control are described. An even clock signal associated with transitioning edges of even-indexed pulses of a global clock signal and an odd clock signal associated with transitioning edges of odd-indexed pulses of a global clock signal may be received. An indication of whether a received command was received on a transitioning edge of an even-indexed pulse may be received. Based on the indication, whether to enable a propagation of the even clock signal to a first delay logic associated with even-indexed pulses or a second delay logic associated with odd-indexed pulses may be determined. Based on the determining, whether to delay a propagation of the command using the first delay logic and the even clock signal or the second delay logic and the odd clock signal may be determined.

20 Claims, 7 Drawing Sheets

DIVIDED CLOCK CONTROL

CROSS REFERENCE

The present application for Patent claims the benefit of U.S. Provisional Patent Application No. 63/492,101 by KWAK et al., entitled "DIVIDED CLOCK CONTROL," filed Mar. 24, 2023, assigned to the assignee hereof, and expressly incorporated by reference herein.

TECHNICAL FIELD

The following relates to one or more systems for memory, including divided clock control.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

To accommodate high frequency global clocks, a memory device may be configured to generate divided clock signals that are tied to the global clock. For example, the memory device may generate a first clock signal that is aligned with transitioning (e.g., rising or falling) edges of odd-indexed pulses (which may be referred to as "odd edges") of the global clock. The first clock signal may be referred to as an "odd clock signal." The memory device may also generate a second clock signal that is aligned with transitioning edges of even-indexed pulses (which may be referred to as "even edges") of the global clock. The second clock signal may be referred to as an "even clock signal." The memory device may also be configured with divided circuitry—e.g., "even circuitry" that uses the even clock signal and "odd circuitry" that uses the odd clock signal. The memory device may use the divided clock signals to process received commands and to operate the divided circuitry.

Because a memory device may not determine in advance whether a command will be received on an odd edge or even edge of the global clock, the memory device may generate both the even clock signal and the odd clock signal and operate both the even circuitry and the odd circuitry throughout operation. However, at different stages in a command receive chain, the memory device may use one of the divided clocks and a portion of the divided circuitry depending on whether a command is received on an even edge or an odd edge. For example, if the memory device receives a command aligned with an odd clock signal (e.g., an odd command), the memory device may use the odd clock and the odd circuitry to process the odd command in a first stage of the command receive chain. And, in a second stage of the command receive chain, if the memory device shifts the odd command to the even domain, the memory device may use the even clock and the even circuitry to process the shifted command. Operating both divided clocks and both sets of divided circuitries throughout the processing of a command may result in increased power consumption for the memory device-relative to if only one divided clock and/or one set of divided circuitries were used. Thus, techniques and configurations that support selectively disabling the unused divided clock and/or divided circuitry may be desired.

To support selectively disabling the unused divided clock and/or divided circuitry, the memory device may include control logic that is configured to determine whether odd or even circuitry is to be used to process a received command or shifted command and to disable the unused circuitry accordingly.

Figure 1:
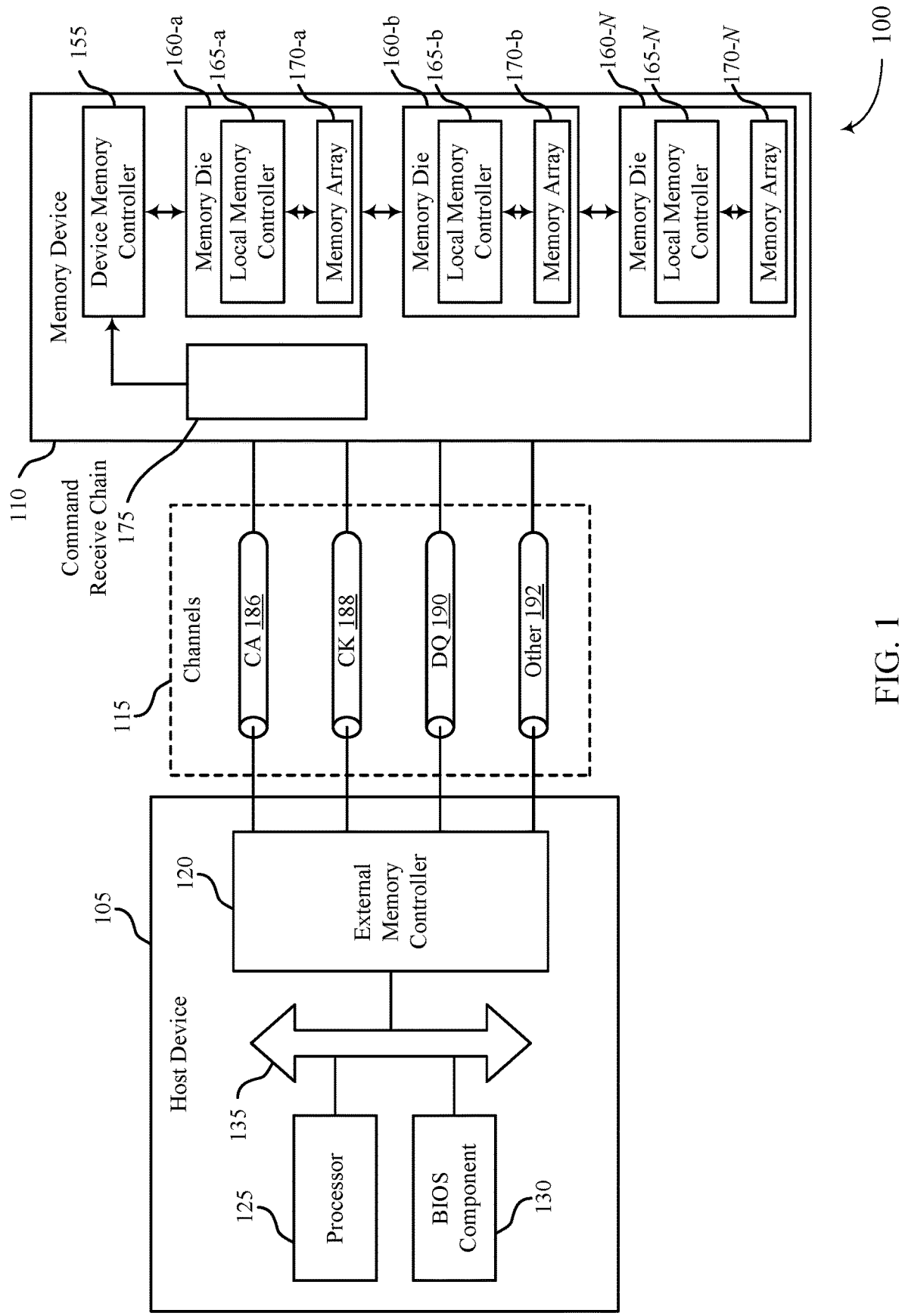
FIG. 1 illustrates an example of a system that supports divided clock control in accordance with examples as disclosed herein.

FIG. 1 illustrates an example of a system 100 that supports divided clock control in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general-purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

As described herein, the memory device 110 may receive commands (e.g., read commands, write commands, etc.) from the host device 105. In some examples, the memory device 110 includes the command receive chain 175, which may process commands received over the CA channels 186 (e.g., using a clock signal received from the host device over the CK channels 188). The command receive chain 175 may include a command decoder for decoding the received commands. The commands may be communicated in coordination with a clock signal (which may be generated by the host device 105 and sent over the CK channels 188). In some examples, the clock signal has a high frequency (e.g., an 8400 MHZ). The clock signal may also be referred to as a global clock or a system clock. In some examples, memory errors may result if the memory device 110 tries to use the global clock for internal timing—e.g., due to missed clock cycles, interference, etc. The command receive chain may further provide the commands to the device memory controller 155, which may execute the commands to access (e.g., read from or write to) data stored in one or more of the memory dies 160.

To accommodate the high frequency of the global clock, the memory device 110 may be configured to generate divided clock signals that are tied to the global clock. For example, the memory device 110 may generate a first clock signal that is aligned with rising edges of odd-indexed pulses (which may be referred to as "odd edges") of the global clock. The first clock signal may be referred to as an "odd clock signal." And a second clock signal that is aligned with rising edges of even-indexed pulses (which may be referred to as "even edges") of the global clock. The second clock signal may be referred to as an "even clock signal." In some examples, instead of being aligned with the rising edges of the global clock, the divided clock signals may be aligned with falling edges of the global clock. The divided clock signals may have lower frequencies than the global clock—e.g., the frequencies of the divided clock signal may be half of the frequency of the global clock. The memory device 110 may also be configured with divided circuitry—e.g., "even circuitry" that uses the even clock signal and "odd circuitry" that uses the odd clock signal. The memory device 110 may use the divided clock signals internally for operating respective circuitry of the divided circuitry.

In some examples, the command decoder in the command receive chain 175 may include circuitry for determining whether a command is received in alignment with the even clock signal (in the even domain) or in alignment with the odd clock signal (in the odd domain). In some examples, the command receive chain 175 may delay a received command using either the even or odd circuitry (e.g., based on a column access strobe (CAS) latency) and may further shift the received command between the even and odd domains based on whether the CAS latency has a duration that extends an even quantity of clock cycles or an odd quantity of clock cycles.

Based on using the divided clock signal, the memory device 110 may process commands received on even edges of the global clock using the even clock signal and the even circuitry. And the memory device 110 may process commands received on odd edges of the global clock using the odd clock signal and the odd circuitry. A command that is received on an even edge may be referred to as an "even command," and a command that is received on an odd edge may be referred to as an "odd command."

Because the memory device 110 may not determine in advance whether a command will be received on an even or odd edge of the global clock, the memory device 110 may generate both the even clock signal and the odd clock signal and operate both the even circuitry and the odd circuitry throughout operation. However, at different stages in a command receive chain, the memory device 110 may only use one of the divided clocks and a portion of the divided circuitry depending on whether a command is received on an even or odd edge. For example, if the memory device 110 receives an odd command, the memory device 110 may only use the odd clock and the odd circuitry to process the odd command in a first stage of the command receive chain. And, in a second stage of the command receive chain, if the memory device 110 shifts the odd command to the even domain, the memory device 110 may only use the even clock and the even circuitry to process the shifted command. Operating both divided clocks and both sets of divided circuitries throughout the processing of a command may result in increased power consumption-relative to if only one divided clock and/or one set of divided circuitries were used. Thus, techniques and configurations that support selectively disabling the unused divided clock and/or divided circuitry may be desired.

To support selectively disabling the unused divided clock and/or divided circuitry, the memory device 110 may include control logic that is configured to determine whether odd or even circuitry is to be used to process a received command or shifted command and to disable the unused circuitry accordingly.

In some examples, the memory device 110 may receive an even clock signal associated with transitioning (e.g., rising or falling) edges of even-indexed pulses of a global clock signal and an odd clock signal associated with transitioning edges of odd-indexed pulses of the global clock signal. The global clock signal may be associated with accessing data stored in the memory device 110, where the memory device 110 may include a volatile memory array (e.g., a memory array 170). The memory device 110 may also receive an indication that a command (e.g., a read command, write command, etc.) for accessing data stored in the volatile memory array has been received at the memory device 110. The indication may indicate whether the command was received on a transitioning edge of an even-indexed pulse of the global clock signal or an odd-indexed pulse of the global clock signal. Based on the indication, the memory device 110 may determine whether to enable a propagation of the even clock signal to a first delay logic (which may be referred to as "even delay logic") associated with delaying commands received on the transitioning edges of the even-indexed pulses of the global clock signal, or to enable a propagation of the odd clock signal to a second delay logic (which may be referred to as "even delay logic") associated with delaying commands received on the transitioning edges of the odd-indexed pulses of the global clock signal. Based on determining whether to enable to propagation of the even or odd clock signal, the memory device 110 may delay a propagation of the command using the first delay logic and the even clock signal or the second delay logic and the odd clock signal.

Based on enabling propagation of a clock signal to one of the even delay logic or the odd delay logic, the memory device 110 may further enable an operation of one of the even delay logic or the odd delay logic for the delaying of the command. By enabling an operation of only one of the even delay logic or the odd delay logic, a power consumption of the memory device 110 may be reduced.

Figure 2:
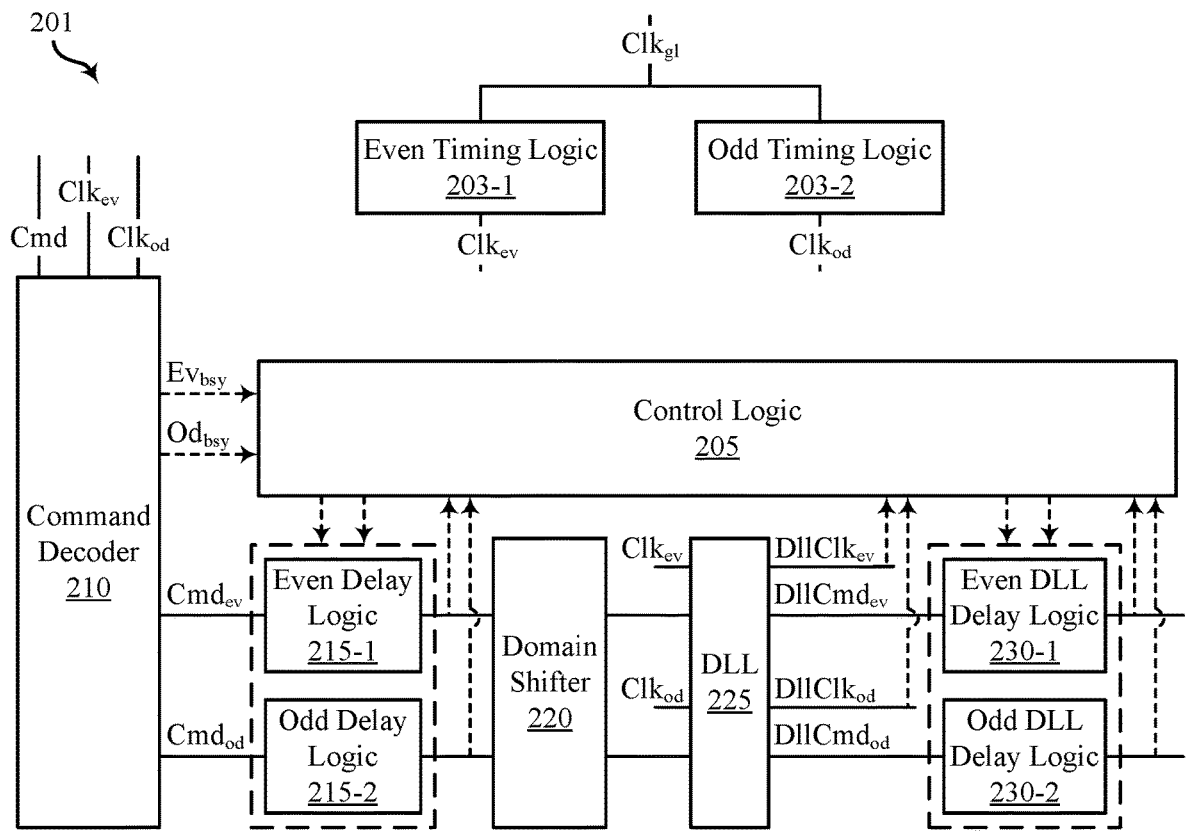
FIG. 2 illustrates an example of a command receive chain that supports divided clock control in accordance with examples as disclosed herein.
Figure 2:
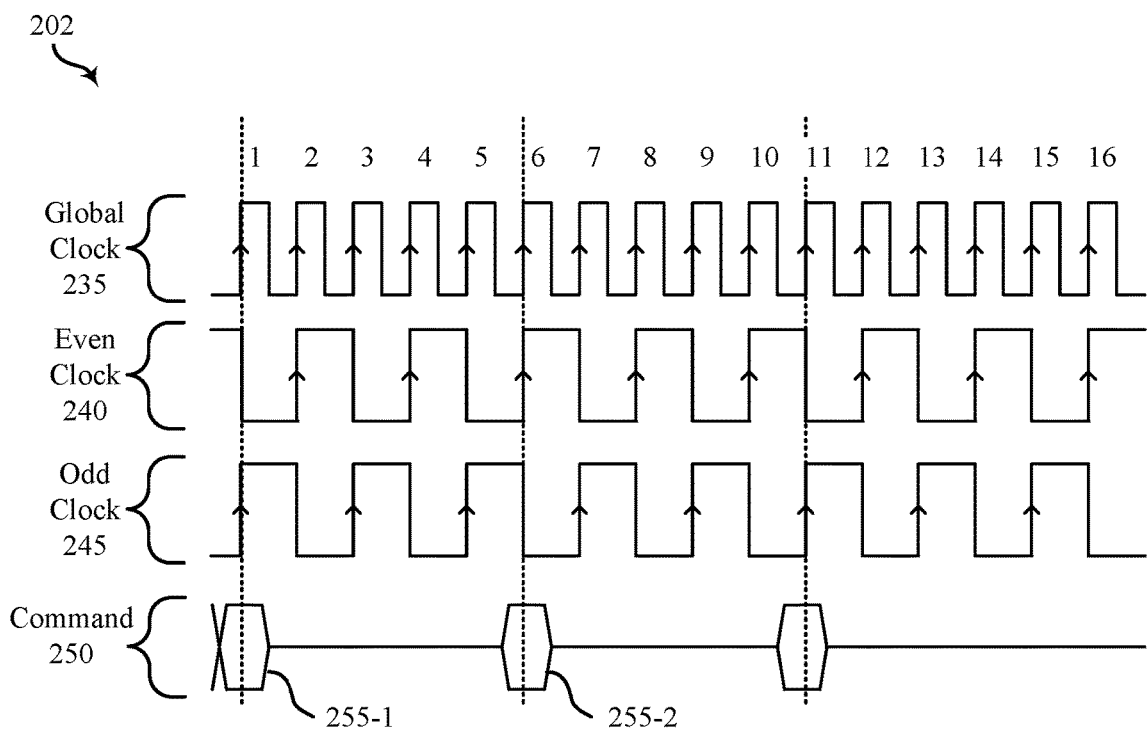

FIG. 2 illustrates an example of a command receive chain that supports divided clock control in accordance with examples as disclosed herein.

A memory device (e.g., the memory device 110 of FIG. 1) may include the command receive chain 201. The command receive chain 201 may include the control logic 205, the command decoder 210, the delay logic 215 (which may include the even delay logic 215-1 and the odd delay logic 215-2), the domain shifter 220, the delay-locked loop (DLL) 225, and the DLL delay logic 230 (which may include the even DLL delay logic 230-1 and the odd DLL delay logic 230-2). The command receive chain 201 may be an example of the command receive chain 175 described with reference to FIG. 1.

The timing logic 203 may be configured to receive a global clock signal ($Clk_{gl}$) and to generate divided clocks. The even timing logic 203-1 may be configured to generate an even clock signal ($Clk_{ev}$) that is aligned with even-indexed pulses of the global clock signal. The odd timing logic 203-2 may be configured to generate an odd clock signal ($Clk_{od}$) that is aligned with the odd-indexed pulses of the global clock signal.

The command decoder 210 may be configured to receive a command signal (Cmd), the even clock signal, and the odd clock signal—e.g., over a C/A channel and a clock channel of a data bus. The command decoder 210 may include a first command decoder for processing even commands (e.g., commands that are received on even rising edges of a global clock signal), which may be referred to as an even command decoder. And a second command decoder for processing odd commands (e.g., commands that are received on odd rising edges of a global clock signal), which may be referred to as an odd command decoder. The even command decoder may output even commands ($Cmd_{ev}$), and the odd command decoder may output odd commands ($Cmd_{od}$) to downstream circuitry in the command receive chain 201. The command decoder 210 may also generate an indication of which of the even command decoder or the odd command decoder is being used to process a received command to downstream circuitry in the command receive chain 201. In some examples, the command decoder 210 (and thus the downstream circuitry) may be configured to process even and odd commands separately. In some examples, the command decoder 210 may provide a processed command to a device memory controller (such as the device memory controller 155 of FIG. 1)—e.g., after adding any delays and/or shifting the command between the even and odd domains.

The delay logic 215 may be configured to delay a propagation of received commands by a duration that is based on a latency (which may be referred to as a CAS latency) associated with receiving a command (e.g., a read command, write command, etc.) and communicating (e.g., outputting, receiving, etc.) corresponding data over a DQ channel, such as the DQ channel 190 of FIG. 1—e.g., so that the command is provided to the device memory controller with a timing that results in the corresponding data being output over the DQ channel when expected by the host device. In some examples, the delay imparted by the delay logic 215 may be less than the CAS latency—e.g., to accommodate for additional delays in propagated a received command caused by downstream circuitry, such as a DLL latency. The even delay logic 215-1 may be configured to delay a propagation of even commands by the duration. The odd delay logic 215-2 may be configured to delay a propagation of odd commands by the duration. As noted herein, because the command decoder 210 may be configured to process even and odd commands separately, only one of the even delay logic 215-1 or the odd delay logic 215-2 may be used to process a respective even or odd command—in some examples, the even delay logic 215-1 may process an even command concurrently with the odd delay logic 215-2 processing an odd command.

The domain shifter 220 may be configured to either maintain a command in a current divided domain or shift the command to a different divided domain. That is, the domain shifter 220 may be configured to determine whether to continue using the same divided clock for the received command or to use the other divided clock for the received command. For example, the domain shifter 220 may be configured to determine whether to continue using the odd clock for subsequent processing of an odd command or to start using the even clock for subsequent processing of the odd command. The domain shifter 220 may be configured to determine whether to shift the command to a different divided domain based on whether the latency associated with receiving a command and communicating corresponding data is an even latency or an odd latency—e.g., whether the quantity of clock cycles spanned by the latency is even or odd. In some examples, the domain shifter 220 is configured to shift a command to a different divided domain if the latency is determined to be an odd latency.

The DLL 225 may be configured to generate divided DLL clock signals that are aligned with the global clock—e.g., to accommodate for clock discrepancies between the divided clock signals and the global clock that may occur during operation. Based on which domain the received command is on when received at the DLL 225 (e.g., after the determination of whether to shift the received command has been made), the DLL 225 may output the command as an even DLL command (which may be referred to as DllCmdev) or an odd DLL command (which may be referred to as DllCmd$_{od}$). As noted herein, since the command decoder 210 may be configured to process even and odd commands separately, the DLL may also output even DLL command and odd DLL commands separately.

The DLL delay logic 230 may be configured to delay a propagation of received DLL commands by a second duration that is based on the latency associated with receiving a command and communicating corresponding data and the delay imparted by the delay logic 215. In some examples, the delay imparted by the DLL delay logic 230 may be equivalent to a difference between the CAS latency and the delay duration imparted by the delay logic 215. The even DLL delay logic 230-1 may be configured to delay a propagation of even DLL commands by the second duration. The odd DLL delay logic 230-2 may be configured to delay a propagation of odd DLL commands by the second duration. As noted herein, since the command decoder 210 may be configured to process even and odd commands separately, the even DLL delay logic 230-1 or the odd DLL delay logic 230-2 may be used to process a respective even or odd command—in some examples, the even DLL delay logic 230-1 may process an even command concurrently with the odd DLL delay logic 230-2 processing an odd command.

The control logic 205 may be configured to selectively enable and disable circuitry within the command receive chain 201 that is not currently being or going to be used for processing a received command. For example, the control logic 205 may be configured to disable the even delay logic 215-1 when an odd command is received. The control logic 205 may also be configured to disable the even DLL delay logic 230-1 when an odd DLL command is output by the DLL 225. Alternatively, the control logic 205 may be configured to disable the odd DLL delay logic 230-2 when the odd command is received at the command decoder 210 and an even DLL command is output by the DLL 225.

FIG. 2 also depicts the diagram 202, which illustrates clock and command signals received at and/or generated by a memory device. The diagram 202 depicts the global clock signal 235, the even clock signal 240 (which may be referred to as Clk$_{ev}$), the odd clock signal 245 (which may be referred to as Clk$_{od}$), and the command signal 250 (which may be referred to as Cmd). The global clock signal 235 and the command signal 250 may be received from a host device (e.g., the host device 105 of FIG. 1). The even clock signal 240 and the odd clock signal 245 may be generated by the memory device from the global clock. The command signal 250 may further depict commands that are received from the host device, where the first command 255-1 may be referred to as an odd command based on being received on the rising edge of the first-indexed pulse of the global clock signal 235, and the second command 255-2 may be referred to as an even command based on being received on the rising edge of the sixth-indexed pulse of the global clock signal 235.

Figure 3:
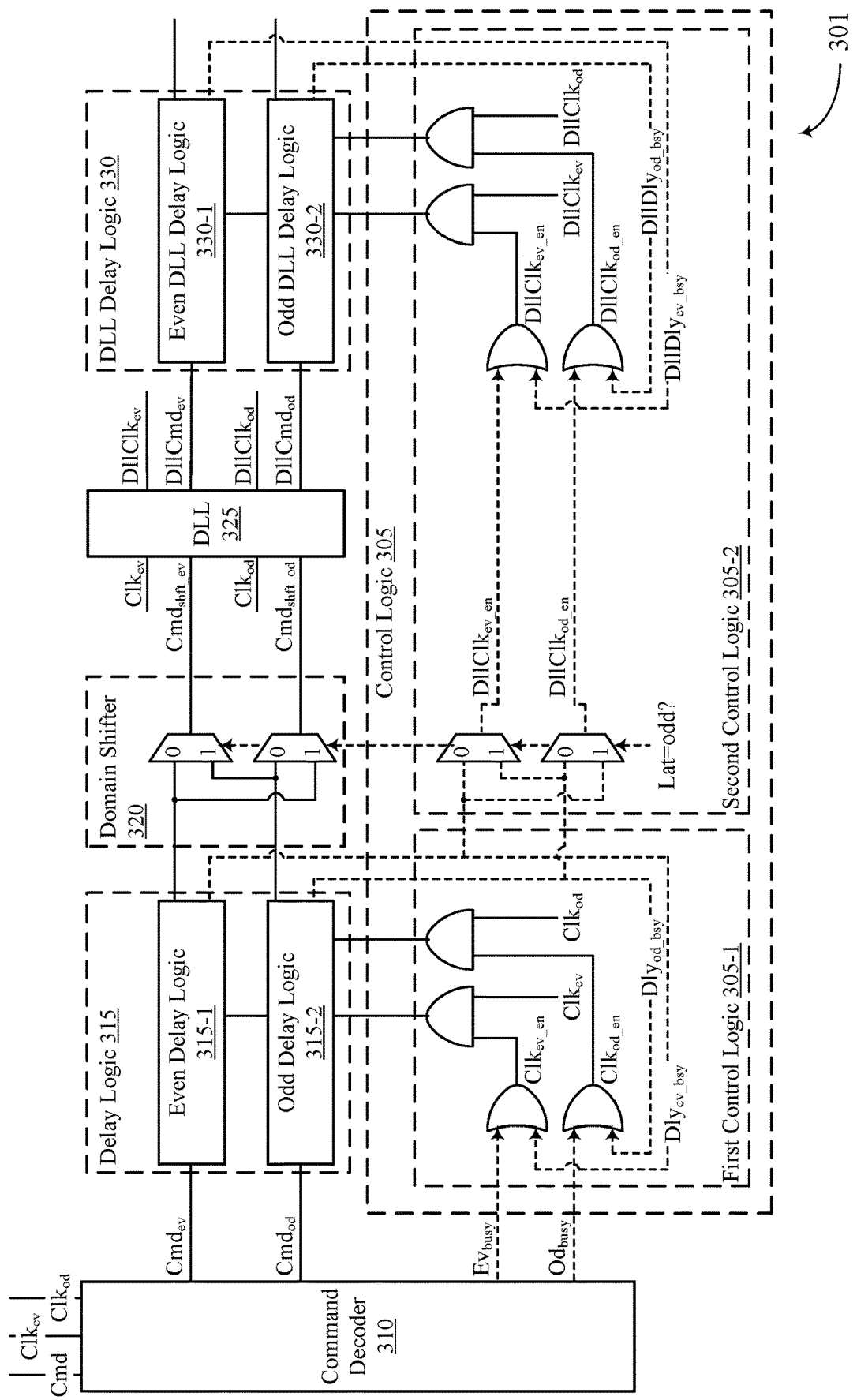
FIG. 3 illustrates an example of a command receive chain that supports divided clock control in accordance with examples as disclosed herein.

FIG. 3 illustrates an example of a command receive chain that supports divided clock control in accordance with examples as disclosed herein.

The command receive chain 301 may be an example of the command receive chain 201 described with reference to FIG. 2. The command receive chain 301 may include the command decoder 310, the delay logic 315, the domain shifter 320, the DLL 325, the DLL delay logic 330, and the control logic 305, which may be respective examples of the command decoder 210, the delay logic 215, the domain shifter 220, the DLL 225, the DLL delay logic 230, and the control logic 205 described with reference to FIG. 2.

As depicted in FIG. 3, the domain shifter 320 may include logic for shifting a received command from one divided domain to another. Also, the control logic 305 may include logic for implementing functions of the control logic.

The domain shifter 320 may include a first multiplexer coupled with the even delay logic 315-1 and the odd delay logic 315-2 in a first configuration and a second multiplexer coupled with the even delay logic 315-1 and the odd delay logic 315-2 in an opposing configuration. The multiplexers may be further configured so that one of the multiplexers outputs a delayed command signal output by either the even delay logic 315-1 or the odd delay logic 315-2 based on whether a latency associated with receiving a command and communicating corresponding data spans an odd or even quantity of clock cycles of the global clock. For example, if the even delay logic 315-1 outputs the delayed even command signal and the latency is an even latency, then the upper multiplexer may pass the delayed even command signal to the even input of the DLL 325, and the lower multiplexer may output a null signal output by the odd delay logic 315-2. Thus, the delayed even command may remain in the even domain (which uses the even clock). Alternatively, if the even delay logic 315-1 outputs the delayed even command signal and the latency is an odd latency, then the upper multiplexer may output a null signal output by the odd delay logic 315-2, and the lower multiplexer may pass the delayed even command signal to the odd input of the DLL 325. Thus, the even command may be shifted to the odd domain (which uses the odd clock) for processing by the subsequent stage of the command receive chain 301.

The control logic may include first control logic 305-1 for complementarily enabling/disabling the even delay logic 315-1 and the odd delay logic 315-2 and may include second control logic 305-2 for complementarily enabling/disabling the even DLL delay logic 330-1 and the odd DLL delay logic 330-2.

The first control logic 305-1 may include a first OR gate configured to receive the signal (EV$_{busy}$) indicating that the even command decoder is busy processing an even command and to receive the signal (Dly$_{ev\_busy}$) indicating whether the even delay logic 315-1 is currently processing a command signal. The first OR gate may also be configured to output a signal (Clk$_{ev\_en}$) for disabling/enabling a propagation of the even clock signal to the even delay logic 315-1.

In some examples, the first OR gate may be configured to output the $Clk_{ev\_en}$ signal with a voltage/logic level for enabling the propagation of the even clock signal to the even delay logic 315-1 if the $EV_{busy}$ and the $Dly_{ev\_busy}$ signals are activated, or vice versa.

The first control logic 305-1 may also include a second OR gate configured to receive the signal ($Od_{busy}$) indicating that the odd command decoder is busy processing an odd command and to receive the signal ($Dly_{od\_busy}$) indicating whether the odd delay logic 315-2 is currently processing a command signal. The second OR gate may also be configured to output a signal ($Clk_{od\_en}$) for disabling/enabling a propagation of the odd clock signal to the odd delay logic 315-2. In some examples, the first OR gate may be configured to output the $Clk_{od\_en}$ signal with a voltage/logic level for disabling the propagation of the odd clock signal to the odd delay logic 315-2 if the $Od_{busy}$ and the $Dly_{od\_busy}$ signals are deactivated, or vice versa.

The first control logic 305-1 may include a first AND gate configured to receive the signal ($Clk_{ev\_en}$) output by the first OR gate and to receive the even clock signal. The first AND gate may also be configured to enable or disable a propagation of the even clock signal to the even delay logic 315-1 based on a voltage/logic level of the $Clk_{ev\_en}$ signal received from the first OR gate. In some examples, the first AND gate may be configured to enable the propagation of the even clock signal if the $Clk_{ev\_en}$ signal has the voltage/logic level for enabling the propagation of the even clock signal, or vice versa.

The first control logic 305-1 may also include a second AND gate configured to receive the signal ($Clk_{od\_en}$) output by the second OR gate and to receive the odd clock signal. The second AND gate may also be configured to enable or disable a propagation of the odd clock signal to the odd delay logic 315-2 based on a voltage/logic level of the $Clk_{od\_en}$ signal received from the second OR gate. In some examples, the first AND gate may be configured to disable the propagation of the odd clock signal if the $Clk_{od\_en}$ signal has the voltage/logic level for disabling the propagation of the odd clock signal, or vice versa.

The second control logic 305-2 may include a set of multiplexers that mirror the multiplexers included in the domain shifter 320. Both the upper multiplexer and the lower multiplexer may be configured to receive the signal ($Dly_{ev\_busy}$) indicating whether the even delay logic 315-1 is currently processing an even command and the signal ($Dly_{od\_busy}$) indicating whether the odd delay logic 315-2 is currently processing an odd command. Based on determining whether the even delay logic 315-1 or the odd delay logic 315-2 is processing a command and whether the latency is an even or odd latency, one of the multiplexers may output an indication of the domain used for the command after the domain shifter 320 performs its operation. For example, if the even delay logic 315-1 is busy and the latency is an even latency, the upper multiplexer may activate the signal ($DllClk_{ev\_en}$) for enabling the even delay-locked clock-based on the command being retained in the even domain. Alternatively, if the even delay logic 315-1 is busy and the latency is an odd latency, the lower multiplexer may activate the signal ($DllClk_{odd\_en}$) for enabling the odd delay-locked clock-based on the command being shifted to the odd domain.

Based on determining whether the command being processed is retained within the same domain or shifted to another domain, the remaining logic in the second control logic 305-2 may determine whether to enable/disable the even/odd DLL delay logic as similarly described with reference to the first control logic 305-1.

That is, the second control logic 305-2 may include a first OR gate configured to receive the signal ($DllClk_{ev\_en}$) indicating that the even delay logic 315-1 is busy processing an even command and to receive the signal ($DlDly_{ev\_busy}$) indicating whether the even DLL delay logic 330-1 is currently processing a command signal. The first OR gate may also be configured to output a signal ($DllClk_{ev\_en}$) for disabling/enabling a propagation of the even delay-locked clock signal to the even DLL delay logic 330-1. In some examples, the first OR gate may be configured to output the $DllClk_{ev\_en}$ signal with a voltage/logic level for enabling the propagation of the even delay-locked clock signal to the even DLL delay logic 330-1 if the $DllClk_{ev\_en}$ and the $DllDly_{ev\_busy}$ signals are activated, or vice versa.

The second control logic 305-2 may also include a second OR gate configured to receive the signal ($DllClk_{od\_en}$) indicating that the odd delay logic 315-2 is busy processing an odd command and to receive the signal ($DllDly_{od\_busy}$) indicating whether the odd DLL delay logic 330-2 is currently processing a command signal. The second OR gate may also be configured to output a signal ($DllClk_{od\_en}$) for disabling/enabling a propagation of the odd delay-locked clock signal to the odd DLL delay logic 330-2. In some examples, the second OR gate may be configured to output the $DllClk_{od\_en}$ signal with a voltage/logic level for disabling the propagation of the odd delay-locked clock signal to the odd DLL delay logic 330-2 if the $DllClk_{od\_en}$ and the $DllDly_{od\_busy}$ signals are deactivated, or vice versa.

The second control logic 305-2 may include a first AND gate configured to receive the signal ($DllClk_{ev\_en}$) output by the first OR gate and to receive the even delay-locked clock signal. The first AND gate may also be configured to enable or disable a propagation of the even delay-locked clock signal to the even DLL delay logic 330-1 based on a voltage/logic level of the $DllClk_{ev\_en}$ signal received from the first OR gate. In some examples, the first AND gate may be configured to enable the propagation of the even delay-locked clock signal if the $DllClk_{ev\_en}$ signal has the voltage/logic level for enabling the propagation of the even delay-locked clock signal, or vice versa.

The second control logic 305-2 may also include a second AND gate configured to receive the signal ($DllClk_{od\_en}$) output by the second OR gate and to receive the odd delay-locked clock signal. The second AND gate may also be configured to enable or disable a propagation of the odd delay-locked clock signal to the odd DLL delay logic 330-2 based on a voltage/logic level of the $DllClk_{od\_en}$ signal received from the second OR gate. In some examples, the first AND gate may be configured to disable the propagation of the odd delay-locked clock signal if the $DllClk_{od\_en}$ signal has the voltage/logic level for disabling the propagation of the odd delay-locked clock signal, or vice versa.

Figure 4:
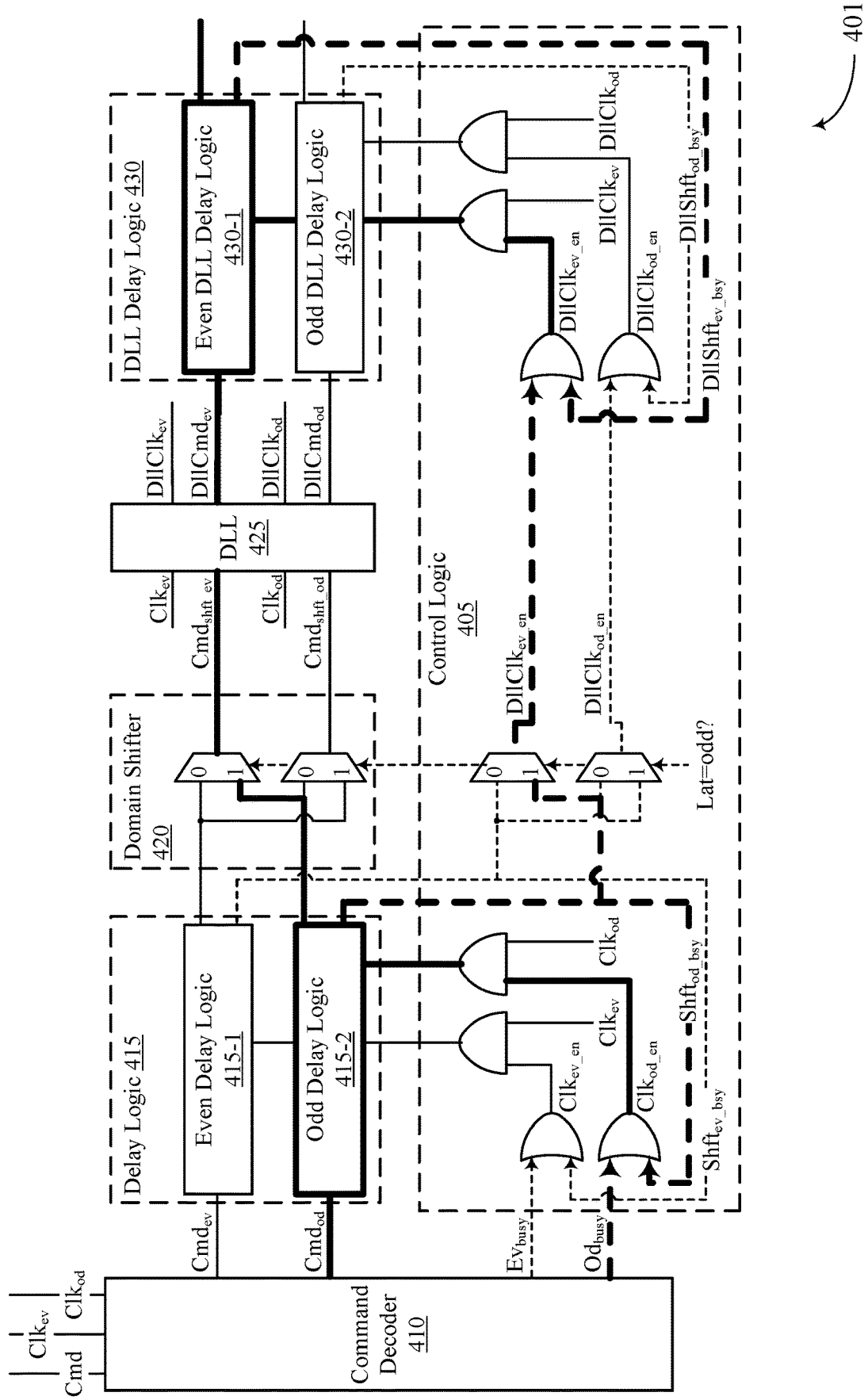
FIG. 4 illustrates an example of a command receive chain that supports divided clock control in accordance with examples as disclosed herein.

FIG. 4 illustrates an example of a command receive chain that supports divided clock control in accordance with examples as disclosed herein.

The command receive chain 401 may be an example of the command receive chain 201 or the command receive chain 301 described with reference to FIGS. 2 and 3. FIG. 4 may depict an example signal activation pattern for the command receive chain 401 when an odd command is received at the command decoder 410 and the latency is an odd latency (the bolded lines and components may depict signals and components that are selectively activated during processing of the odd command). Thus, in the example of FIG. 4, the control logic 405 may disable the even delay logic 415-1 while the odd command is processed by the odd delay logic 415-2. The control logic 405 may determine that the odd command is shifted (e.g., via domain shifter 420) to the even domain based on the latency being an odd latency. And may disable the odd DLL delay logic 430-2 while the shifted odd command is processed by the even DLL delay logic 430-1 (e.g., the shifted odd command may be input to the even DDL delay logic 430-1 via DLL 425). By disabling the even delay logic 415-1 during the first stage of processing the odd command and the odd DLL delay logic 430-2 during the second stage of processing the shifted odd command, a power of the command receive chain 401 used to process the command may be reduced.

Figure 5:
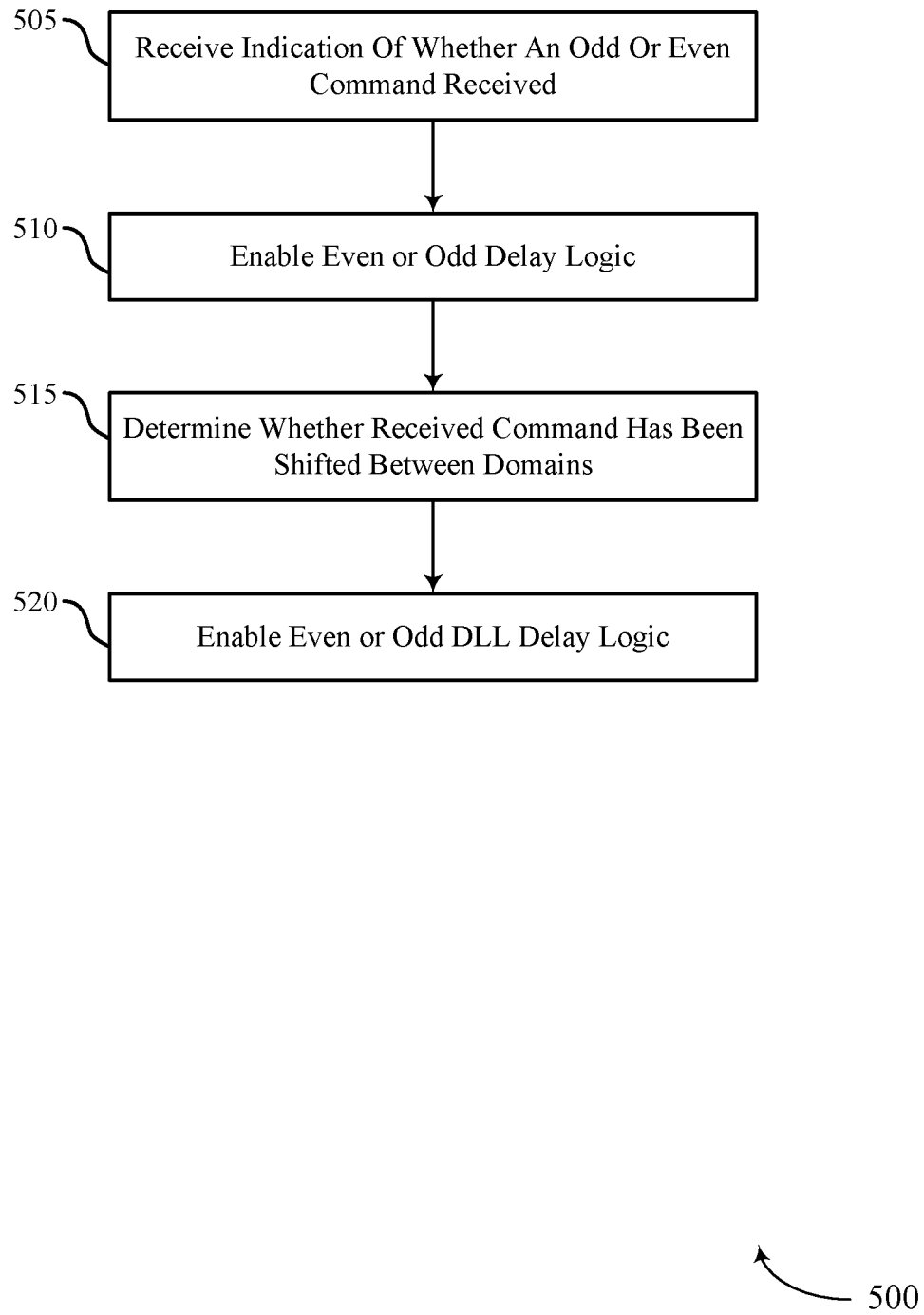
FIG. 5 illustrates an example of a set of operations for divided clock control in accordance with examples as disclosed herein.

FIG. 5 illustrates an example of a set of operations for divided clock control in accordance with examples as disclosed herein.

The flowchart 500 may be performed by control logic described herein (e.g., the control logic 205 of FIG. 2, the control logic 305 of FIG. 3, or the control logic 405 of FIG. 4). In some examples, the flowchart 500 illustrates an example set of operations performed to support divided clock control. For example, the flowchart 500 may include operations for enabling/disabling divided components in a command receive chain based on a type of command (e.g., an even or odd command) received at the command decoder and whether a latency associated with receiving a command and outputting data is an even latency or an odd latency.

At 505, an indication of whether an odd command or an even command has been received at a command decoder may be received (e.g., at first-stage logic of the control logic, such as the first control logic 305-1). In some examples, the indication may be based on a voltage/logic level of a signal ($EV_{busy}$) for indicating whether an even decoder of the command decoder is being used to process the received command and a voltage/logic level of a signal ($Od_{busy}$) for indicating whether an odd decoder of the command decoder to process the received command.

At 510, the even delay logic or the odd delay logic used to delay the received command may be complementarily enabled and disabled (e.g., by the first-stage logic). For example, if the $EV_{busy}$ signal indicates that the even command decoder is busy (and an even command has been received), then the first-stage logic may enable the even delay logic. In such cases, the $Od_{busy}$ signal may indicate that the odd command decoder is not busy, and the first-stage logic may disable the odd delay logic.

At 515, whether the received command has been shifted from one divided domain to the other divided domain may be made (e.g., by second-stage logic of the control logic, such as the second control logic 305-2). For example, if the latency is an odd latency, the second-stage logic may determine that the received command will be shifted to the other divided domain. In some examples, if the second-stage logic determines that the even delay logic is being used to process the received command and the latency is an odd latency, the second-stage logic may determine that the received even command has been shifted to the odd domain. In another example, if the second-stage logic determines that the even delay logic is being used to process the received command and the latency is an even latency, the second-stage logic may determine that the received even command has been maintained in the even domain.

The second-stage logic may further generate a signal to indicate which domain the received command is in after the domain shifting operation. For example, the second-stage logic may generate a signal ($DllClk_{ev\_en}$) for indicating whether the received command is in the even domain after the shifting operation and a signal ($DllClk_{od\_en}$) for indicating whether the received command is in the odd domain after the shifting operation.

At 520, the even DLL delay logic or the odd DLL delay logic used to delay the command received at the DLL may be complementarily enabled and disabled (e.g., by the second-stage logic). For example, if the $DllClk_{ev\_en}$ signal indicates that the received command is in the even domain after the shifting operation, then the second-stage logic may enable the even DLL delay logic. In such cases, the $DllClk_{ev\_en}$ signal may indicate that the received command is not in the odd domain after the shifting operation, and the second-stage logic may disable the odd DLL delay logic.

Aspects of the flowchart 500 may be implemented by a controller, among other components. Additionally, or alternatively, aspects of the flowchart 500 may be implemented as instructions stored in memory (e.g., firmware stored in a memory coupled with a controller). For example, the instructions, when executed by a controller, may cause the controller to perform the operations of the flowchart 500.

One or more of the operations described in the flowchart 500 may be performed earlier or later, omitted, replaced, supplemented, or combined with another operation. Also, additional operations described herein may replace, supplement or be combined with one or more of the operations described in the flowchart 500.

Figure 6:
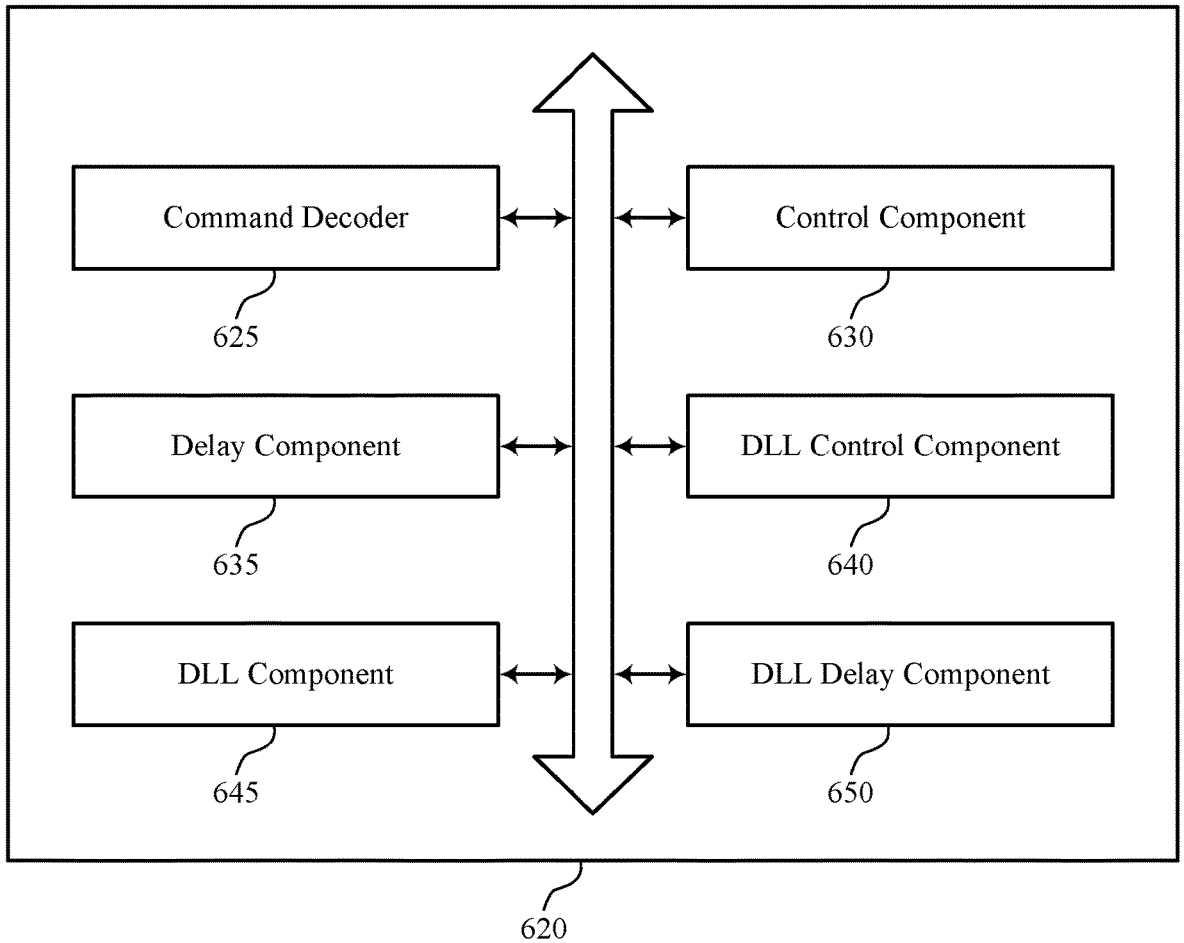
FIG. 6 illustrates a block diagram of a memory device that supports divided clock control in accordance with examples as disclosed herein.

FIG. 6 illustrates a block diagram 600 of a memory device 620 that supports divided clock control in accordance with examples as disclosed herein. The memory device 620 may be an example of aspects of a memory device as described with reference to FIGS. 1 through 5. The memory device 620, or various components thereof, may be an example of means for performing various aspects of divided clock control as described herein. For example, the memory device 620 may include a command decoder 625, a control component 630, a delay component 635, a DLL control component 640, a DLL component 645, a DLL delay component 650, or any combination thereof. Each of these components may communicate, directly or indirectly, with one another (e.g., via one or more buses).

The command decoder 625 may be configured as or otherwise support a means for receiving an even clock signal associated with transitioning edges of even-indexed pulses of a global clock signal and an odd clock signal associated with transitioning edges of odd-indexed pulses of the global clock signal, where the global clock signal is associated with accessing data stored in a memory device that includes a volatile memory array. The control component 630 may be configured as or otherwise support a means for receiving an indication that a command for accessing data stored in the volatile memory array has been received at the memory device, where the indication further indicates whether the command was received on a transitioning edge of an even-indexed pulse of the global clock signal or a transitioning edge of an odd-indexed pulse of the global clock signal. In some examples, the control component 630 may be configured as or otherwise support a means for determining, based at least in part on the indication, whether to enable a propagation of the even clock signal to a first delay logic associated with delaying commands received on the transitioning edges of the even-indexed pulses of the global clock signal or to enable a propagation of the odd clock signal to a second delay logic associated with delaying commands received on the transitioning edges of the odd-indexed pulses of the global clock signal. The delay component 635 may be configured as or otherwise support a means for delaying a propagation of the command using the first delay logic and the even clock signal or the second delay logic and the odd clock signal based at least in part on the determining.

In some examples, the control component 630 may be configured as or otherwise support a means for generating, based at least in part on the determining, a signal for enabling one of the propagation of the even clock signal to the first delay logic or the propagation of the odd clock signal to the second delay logic based at least in part on which of the first delay logic or the second delay logic is used to delay the propagation of the command.

In some examples, the propagation of the even clock signal to the first delay logic is enabled based at least in part on the indication indicating that the command was received on the transitioning edge of the even-indexed pulse of the global clock signal. In some examples, the second delay logic remains disabled during the propagation of the command through the first delay logic.

In some examples, the control component 630 may be configured as or otherwise support a means for receiving a second indication of whether a latency between receiving commands and communicating corresponding data spans an even quantity of clock cycles or an odd quantity of clock cycles. In some examples, the DLL control component 640 may be configured as or otherwise support a means for determining, after the propagation of the command through one of the first delay logic or the second delay logic, whether to shift an alignment of the command between the even clock signal and the odd clock signal based at least in part on the second indication. In some examples, the DLL control component 640 may be configured as or otherwise support a means for generating, after determining whether to shift the alignment of the command, a third indication of whether the command is aligned with the even clock signal or the odd clock signal.

In some examples, the DLL control component 640 may be configured as or otherwise support a means for generating, based at least in part on the third indication, a signal for enabling one of a third delay logic associated with delaying commands aligned with the transitioning edges of the even-indexed pulses of the global clock signal or a fourth delay logic associated with delaying commands received on the transitioning edges of the odd-indexed pulses of the global clock signal.

In some examples, the DLL component 645 may be configured as or otherwise support a means for receiving an even delay-locked clock signal associated with the even clock signal and an odd delay-locked clock signal associated with the odd clock signal. In some examples, the DLL control component 640 may be configured as or otherwise support a means for determining, based at least in part on the second indication, whether to enable a propagation of one of the even delay-locked clock signal or the odd delay-locked clock signal to a corresponding one of the third delay logic or the fourth delay logic. In some examples, the DLL delay component 650 may be configured as or otherwise support a means for delaying the propagation of the command using one of the third delay logic and the even delay-locked clock signal or the fourth delay logic and the odd delay-locked clock signal based at least in part on the determining, where the other of the third delay logic or the fourth delay logic remains disabled during the propagation of the command through the third delay logic or the fourth delay logic.

In some examples, the DLL control component 640 may be configured as or otherwise support a means for receiving a second indication that a latency between receiving commands and communicating corresponding data spans an odd quantity of clock cycles. In some examples, the DLL control component 640 may be configured as or otherwise support a means for determining, after the propagation of the command through one of the first delay logic or the second delay logic, to shift an alignment of the command between the even clock signal and the odd clock signal based at least in part on the second indication. In some examples, the DLL control component 640 may be configured as or otherwise support a means for generating, after determining to shift the alignment of the command between the even clock signal and the odd clock signal, a third indication of whether the command is aligned with the even clock signal or the odd clock signal.

In some examples, the DLL control component 640 may be configured as or otherwise support a means for receiving a second indication that a latency between receiving commands and communicating corresponding data spans an odd quantity of clock cycles, where the indication indicates that the command was received on the transitioning edge of the even-indexed pulse of the global clock signal. In some examples, the DLL control component 640 may be configured as or otherwise support a means for determining, after the propagation of the command through one of the first delay logic, to shift an alignment of the command from the even clock signal to the odd clock signal based at least in part on the second indication. In some examples, the DLL control component 640 may be configured as or otherwise support a means for generating, after determining to shift the alignment of the command to the odd clock signal, a third indication that the command is aligned with the odd clock signal.

In some examples, the DLL control component 640 may be configured as or otherwise support a means for generating, based at least in part on the third indication indicating that the command is aligned with the odd clock signal, a signal for enabling a propagation of an odd delay-locked clock signal to a fourth delay logic associated with delaying commands received on the transitioning edges of the odd-indexed pulses of the global clock signal, where a third delay logic associated with delaying commands received on the transitioning edges of the even-indexed pulses of the global clock signal remains disabled during the propagation of the command through the fourth delay logic.

Figure 7:
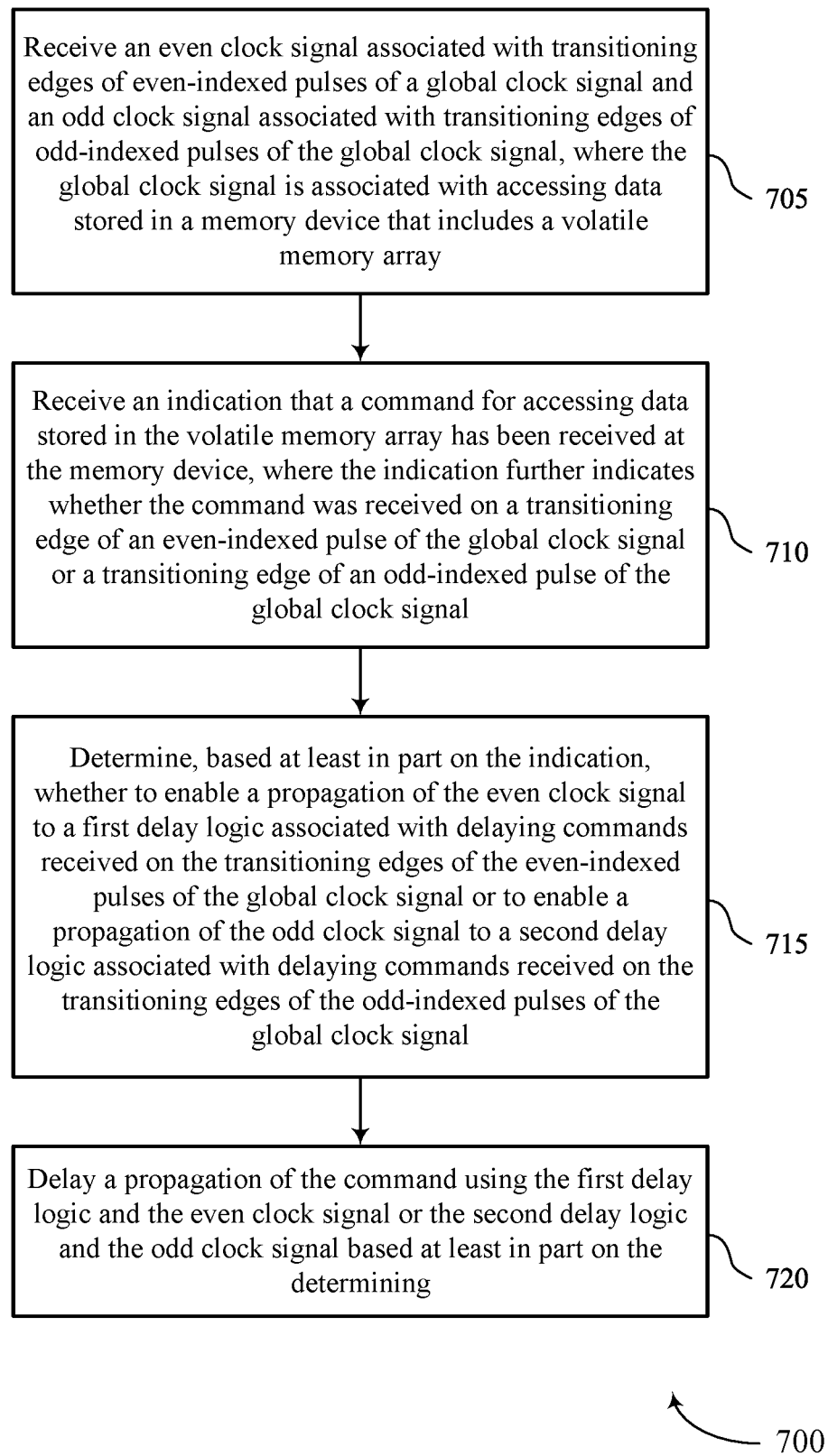
FIG. 7 illustrates a flowchart showing a method or methods that support divided clock control in accordance with examples as disclosed herein.

FIG. 7 illustrates a flowchart showing a method 700 that supports divided clock control in accordance with examples as disclosed herein. The operations of method 700 may be implemented by a memory device or its components as described herein. For example, the operations of method 700 may be performed by a memory device as described with reference to FIGS. 1 through 6. In some examples, a memory device may execute a set of instructions to control the functional elements of the device to perform the described functions. Additionally, or alternatively, the memory device may perform aspects of the described functions using special-purpose hardware.

At 705, the method may include receiving an even clock signal associated with transitioning edges of even-indexed pulses of a global clock signal and an odd clock signal associated with transitioning edges of odd-indexed pulses of the global clock signal, where the global clock signal is associated with accessing data stored in a memory device that includes a volatile memory array. The operations of 705 may be performed in accordance with examples as disclosed herein. In some examples, aspects of the operations of 705 may be performed by a command decoder 625 as described with reference to FIG. 6.

At 710, the method may include receiving an indication that a command for accessing data stored in the volatile memory array has been received at the memory device, where the indication further indicates whether the command was received on a transitioning edge of an even-indexed pulse of the global clock signal or a transitioning edge of an odd-indexed pulse of the global clock signal. The operations of 710 may be performed in accordance with examples as disclosed herein. In some examples, aspects of the operations of 710 may be performed by a control component 630 as described with reference to FIG. 6.

At 715, the method may include determining, based at least in part on the indication, whether to enable a propagation of the even clock signal to a first delay logic associated with delaying commands received on the transitioning edges of the even-indexed pulses of the global clock signal or to enable a propagation of the odd clock signal to a second delay logic associated with delaying commands received on the transitioning edges of the odd-indexed pulses of the global clock signal. The operations of 715 may be performed in accordance with examples as disclosed herein. In some examples, aspects of the operations of 715 may be performed by a control component 630 as described with reference to FIG. 6.

At 720, the method may include delaying a propagation of the command using the first delay logic and the even clock signal or the second delay logic and the odd clock signal based at least in part on the determining. The operations of 720 may be performed in accordance with examples as disclosed herein. In some examples, aspects of the operations of 720 may be performed by a delay component 635 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving an even clock signal associated with transitioning edges of even-indexed pulses of a global clock signal and an odd clock signal associated with transitioning edges of odd-indexed pulses of the global clock signal, where the global clock signal is associated with accessing data stored in a memory device that includes a volatile memory array; receiving an indication that a command for accessing data stored in the volatile memory array has been received at the memory device, where the indication further indicates whether the command was received on a transitioning edge of an even-indexed pulse of the global clock signal or a transitioning edge of an odd-indexed pulse of the global clock signal; determining, based at least in part on the indication, whether to enable a propagation of the even clock signal to a first delay logic associated with delaying commands received on the transitioning edges of the even-indexed pulses of the global clock signal or to enable a propagation of the odd clock signal to a second delay logic associated with delaying commands received on the transitioning edges of the odd-indexed pulses of the global clock signal; and delaying a propagation of the command using the first delay logic and the even clock signal or the second delay logic and the odd clock signal based at least in part on the determining.

Aspect 2: The method, apparatus, or non-transitory computer-readable medium of aspect 1, further including operations, features, circuitry, logic, means, or instructions, or any combination thereof for generating, based at least in part on the determining, a signal for enabling one of the propagation of the even clock signal to the first delay logic or the propagation of the odd clock signal to the second delay logic based at least in part on which of the first delay logic or the second delay logic is used to delay the propagation of the command.

Aspect 3: The method, apparatus, or non-transitory computer-readable medium of any of aspects 1 through 2, where the propagation of the even clock signal to the first delay logic is enabled based at least in part on the indication indicating that the command was received on the transitioning edge of the even-indexed pulse of the global clock signal and the second delay logic remains disabled during the propagation of the command through the first delay logic.

Aspect 4: The method, apparatus, or non-transitory computer-readable medium of any of aspects 1 through 3, further including operations, features, circuitry, logic, means, or instructions, or any combination thereof for receiving a second indication of whether a latency between receiving commands and communicating corresponding data spans an even quantity of clock cycles or an odd quantity of clock cycles; determining, after the propagation of the command through one of the first delay logic or the second delay logic, whether to shift an alignment of the command between the even clock signal and the odd clock signal based at least in part on the second indication; and generating, after determining whether to shift the alignment of the command, a third indication of whether the command is aligned with the even clock signal or the odd clock signal.

Aspect 5: The method, apparatus, or non-transitory computer-readable medium of aspect 4, further including operations, features, circuitry, logic, means, or instructions, or any combination thereof for generating, based at least in part on the third indication, a signal for enabling one of a third delay logic associated with delaying commands aligned with the transitioning edges of the even-indexed pulses of the global clock signal or a fourth delay logic associated with delaying commands received on the transitioning edges of the odd-indexed pulses of the global clock signal.

Aspect 6: The method, apparatus, or non-transitory computer-readable medium of aspect 5, further including operations, features, circuitry, logic, means, or instructions, or any combination thereof for receiving an even delay-locked clock signal associated with the even clock signal and an odd delay-locked clock signal associated with the odd clock signal; determining, based at least in part on the second indication, whether to enable a propagation of one of the even delay-locked clock signal or the odd delay-locked clock signal to a corresponding one of the third delay logic or the fourth delay logic; and delaying the propagation of the command using one of the third delay logic and the even delay-locked clock signal or the fourth delay logic and the odd delay-locked clock signal based at least in part on the determining, where the other of the third delay logic or the fourth delay logic remains disabled during the propagation of the command through the third delay logic or the fourth delay logic.

Aspect 7: The method, apparatus, or non-transitory computer-readable medium of any of aspects 1 through 6, further including operations, features, circuitry, logic, means, or instructions, or any combination thereof for receiving a second indication that a latency between receiving commands and communicating corresponding data spans an odd quantity of clock cycles; determining, after the propagation of the command through one of the first delay logic or the second delay logic, to shift an alignment of the command between the even clock signal and the odd clock signal based at least in part on the second indication; and generating, after determining to shift the alignment of the command between the even clock signal and the odd clock signal, a third indication of whether the command is aligned with the even clock signal or the odd clock signal.

Aspect 8: The method, apparatus, or non-transitory computer-readable medium of any of aspects 1 through 7, further including operations, features, circuitry, logic, means, or instructions, or any combination thereof for receiving a second indication that a latency between receiving commands and communicating corresponding data spans an odd quantity of clock cycles, where the indication indicates that the command was received on the transitioning edge of the even-indexed pulse of the global clock signal; determining, after the propagation of the command through one of the first delay logic, to shift an alignment of the command from the even clock signal to the odd clock signal based at least in part on the second indication; and generating, after determining to shift the alignment of the command to the odd clock signal, a third indication that the command is aligned with the odd clock signal.

Aspect 9: The method, apparatus, or non-transitory computer-readable medium of aspect 8, further including operations, features, circuitry, logic, means, or instructions, or any combination thereof for generating, based at least in part on the third indication indicating that the command is aligned with the odd clock signal, a signal for enabling a propagation of an odd delay-locked clock signal to a fourth delay logic associated with delaying commands received on the transitioning edges of the odd-indexed pulses of the global clock signal, where a third delay logic associated with delaying commands received on the transitioning edges of the even-indexed pulses of the global clock signal remains disabled during the propagation of the command through the fourth delay logic.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 10: An apparatus, including: a volatile memory array (170); a command decoder (210) configured to receive commands for accessing data stored in the volatile memory array; first timing logic (203-1) configured to generate an even clock signal (240) associated with transitioning edges of even-indexed pulses of a global clock signal (235); second timing logic (203-2) configured to generate an odd clock signal (245) associated with transitioning edges of odd-indexed pulses of the global clock signal; first delay logic (215-1) configured to use the even clock signal to delay first commands received on the transitioning edges of the even-indexed pulses of the global clock signal based at least in part on a latency between receiving commands and communicating corresponding data; second delay logic (215-2) configured to use the odd clock signal to delay second commands received on the transitioning edges of the odd-indexed pulses of the global clock signal based at least in part on the latency between receiving commands and communicating corresponding data; and logic (205) configured to enable a propagation of the even clock signal to the first delay logic or to enable a propagation of the odd clock signal to the second delay logic based at least in part on whether a corresponding command is received on a transitioning edge of an even-indexed pulse of the global clock signal or a transitioning edge of an odd-indexed pulse of the global clock signal.

Aspect 11: The apparatus of aspect 10, where the logic (305) includes first-stage logic (305-1) including: a first OR gate configured to receive a first signal configured to indicate whether an even portion of the command decoder is activated and a first busy signal configured to indicate whether the first delay logic is activated and to output a first enable signal based at least in part on the first signal and the first busy signal; and a second OR gate configured to receive a second signal configured to indicate whether an odd portion of the command decoder is activated and a second busy signal configured to indicate whether the second delay logic is activated and to output a second enable signal based at least in part on the second signal and the second busy signal.

Aspect 12: The apparatus of aspect 11, where the first-stage logic (305-1) includes: a first AND gate configured to receive the first enable signal from the first OR gate and the even clock signal and to output a first clock signal for the first delay logic based at least in part on the first enable signal and the even clock signal; and a second AND gate configured to receive the second enable signal from the second OR gate and the odd clock signal and to output a second clock signal for the second delay logic based at least in part on the second enable signal and the odd clock signal.

Aspect 13: The apparatus of any of aspects 10 through 12, further including: a delay-locked loop (225) configured to generate an even delay-locked clock signal based at least in part on the even clock signal and an odd delay-locked clock signal based at least in part on the odd clock signal; third delay logic (230-1) configured to use the even delay-locked clock signal to delay third commands received at the delay-locked loop on the transitioning edges of the even-indexed pulses of the global clock signal; and fourth delay logic (230-2) configured to use the odd delay-locked clock signal to delay fourth commands received at the delay-locked loop on the transitioning edges of the odd-indexed pulses of the global clock signal.

Aspect 14: The apparatus of aspect 13, further including: shifting logic (220) configured to shift an alignment of commands between the even clock signal and the odd clock signal based at least in part on whether the latency between receiving commands and communicating corresponding data span an even quantity of clock cycles or an odd quantity of clock cycles, where the logic (305) includes second-stage logic (305-2) configured to: enable one of the even delay-locked clock signal or the odd delay-locked clock signal to propagate to a corresponding one of the third delay logic or the fourth delay logic based at least in part on whether the corresponding command is received at the delay-locked loop on the transitioning edge of the even-indexed pulse of the global clock signal or the transitioning edge of the odd-indexed pulse of the global clock signal.

Aspect 15: The apparatus of aspect 14, where the second-stage logic (305-2) includes: second shifting logic configured to output a first enable signal if the latency between receiving commands and communicating corresponding data spans the even quantity of clock cycles and a second enable signal if the latency between receiving commands and communicating corresponding data spans the odd quantity of clock cycles.

Aspect 16: The apparatus of aspect 15, where the second-stage logic (305-2) includes: a first OR gate configured to receive the first enable signal from the second shifting logic and a first busy signal configured to indicate whether the third delay logic is activated and to output a third enable signal based at least in part on the first enable signal and the first busy signal; and a second OR gate configured to receive the second enable signal from the second shifting logic and a second busy signal configured to indicate whether the fourth delay logic is activated and to output a fourth enable signal based at least in part on the second enable signal and the second busy signal.

Aspect 17: The apparatus of aspect 16, where the second-stage logic (305-2) includes: a first AND gate configured to receive the third enable signal from the first OR gate and the even delay-locked clock signal and to output a first clock signal for the third delay logic based at least in part on the third enable signal and the even delay-locked clock signal; and a second AND gate configured to receive the fourth enable signal from the second OR gate and the odd delay-locked clock signal and to output a second clock signal for the fourth delay logic based at least in part on the fourth enable signal and the odd delay-locked clock signal.

An apparatus is described. The following provides an overview of aspects of the apparatus as described herein:

Aspect 18: An apparatus, including: a memory device including a volatile memory array; and a controller coupled with the volatile memory array and configured to cause the apparatus to: receive an even clock signal associated with transitioning edges of even-indexed pulses of a global clock signal and an odd clock signal associated with transitioning edges of odd-indexed pulses of the global clock signal, where the global clock signal is associated with accessing data stored in the memory device; receive an indication that a command for accessing data stored in the volatile memory array has been received at the memory device, where the indication further indicates whether the command was received on a transitioning edge of an even-indexed pulse of the global clock signal; determine, based at least in part on the indication, whether to enable a propagation of the even clock signal to a first delay logic associated with delaying commands received on the transitioning edges of the even-indexed pulses of the global clock signal or to enable a propagation of the odd clock signal to a second delay logic associated with delaying commands received on the transitioning edges of the odd-indexed pulses of the global clock signal; and delaying a propagation of the command using one of the first delay logic and the even clock signal or the second delay logic and the odd clock signal based at least in part on the determining.

Aspect 19: The apparatus of aspect 18, where the controller is further configured to cause the apparatus to: generate, based at least in part on the determining, a signal for enabling one of the propagation of the even clock signal to the first delay logic or the propagation of the odd clock signal to the second delay logic based at least in part on which of the first delay logic or the second delay logic is used to delay the propagation of the command.

Aspect 20: The apparatus of any of aspects 18 through 19, where the controller is further configured to cause the apparatus to: receive a second indication of whether a latency between receiving commands and communicating corresponding data spans an even quantity of clock cycles or an odd quantity of clock cycles; determine, after the propagation of the command through one of the first delay logic or the second delay logic, whether to shift an alignment of the command between the even clock signal and the odd clock signal based at least in part on the second indication; and generate, after determining whether to shift the alignment of the command, a third indication of whether the command is aligned with the even clock signal or the odd clock signal.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET) and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   receiving an even clock signal associated with one of rising and falling edges of even-indexed pulses of a global clock signal and an odd clock signal associated with one of rising and falling edges of odd-indexed pulses of the global clock signal, wherein the global clock signal is associated with accessing data stored in a memory device that comprises a volatile memory array;
   receiving an indication that a command for accessing data stored in the volatile memory array has been received at the memory device, wherein the indication further indicates whether the command was received on one of a rising and falling edge of an even-indexed pulse of the global clock signal;
   determining, based at least in part on the indication, whether to enable a propagation of the even clock signal to a first delay logic associated with delaying commands received on the one of rising and falling edges of the even-indexed pulses of the global clock signal or to enable a propagation of the odd clock signal to a second delay logic associated with delaying commands received on the one of rising and falling edges of the odd-indexed pulses of the global clock signal; and delaying a propagation of the command using the first delay logic and the even clock signal or the second delay logic and the odd clock signal based at least in part on the determining.

2. The method of claim 1, further comprising:
generating, based at least in part on the determining, a signal for enabling one of the propagation of the even clock signal to the first delay logic or the propagation of the odd clock signal to the second delay logic based at least in part on which of the first delay logic or the second delay logic is used to delay the propagation of the command.

3. The method of claim 1, wherein the propagation of the even clock signal to the first delay logic is enabled based at least in part on the indication indicating that the command was received on the one of the rising and falling edge of the even-indexed pulse of the global clock signal, and wherein the second delay logic remains disabled during the propagation of the command through the first delay logic.

4. The method of claim 1, further comprising:
receiving a second indication of whether a latency between receiving commands and communicating corresponding data spans an even quantity of clock cycles or an odd quantity of clock cycles;
determining, after the propagation of the command through one of the first delay logic or the second delay logic, whether to shift an alignment of the command between the even clock signal and the odd clock signal based at least in part on the second indication; and
generating, after determining whether to shift the alignment of the command, a third indication of whether the command is aligned with the even clock signal or the odd clock signal.

5. The method of claim 4, further comprising:
generating, based at least in part on the third indication, a signal for enabling one of a third delay logic associated with delaying commands aligned with the one of rising and falling edges of the even-indexed pulses of the global clock signal or a fourth delay logic associated with delaying commands received on the one of rising and falling edges of the odd-indexed pulses of the global clock signal.

6. The method of claim 5, further comprising:
receiving an even delay-locked clock signal associated with the even clock signal and an odd delay-locked clock signal associated with the odd clock signal;
determining, based at least in part on the second indication, whether to enable a propagation of one of the even delay-locked clock signal or the odd delay-locked clock signal to a corresponding one of the third delay logic or the fourth delay logic; and
delaying the propagation of the command using one of the third delay logic and the even delay-locked clock signal or the fourth delay logic and the odd delay-locked clock signal based at least in part on the determining, wherein the other of the third delay logic or the fourth delay logic remains disabled during the propagation of the command through the third delay logic or the fourth delay logic.

7. The method of claim 1, further comprising:
receiving a second indication that a latency between receiving commands and communicating corresponding data spans an odd quantity of clock cycles;
determining, after the propagation of the command through one of the first delay logic or the second delay logic, to shift an alignment of the command between the even clock signal and the odd clock signal based at least in part on the second indication; and
generating, after determining to shift the alignment of the command between the even clock signal and the odd clock signal, a third indication of whether the command is aligned with the even clock signal or the odd clock signal.

8. The method of claim 1, wherein the indication indicates that the command was received on the one of the rising and falling edge of the even-indexed pulse of the global clock signal, the method further comprising:
receiving a second indication that a latency between receiving commands and communicating corresponding data spans an odd quantity of clock cycles;
determining, after the propagation of the command through one of the first delay logic, to shift an alignment of the command from the even clock signal to the odd clock signal based at least in part on the second indication; and
generating, after determining to shift the alignment of the command to the odd clock signal, a third indication that the command is aligned with the odd clock signal.

9. The method of claim 8, further comprising:
generating, based at least in part on the third indication indicating that the command is aligned with the odd clock signal, a signal for enabling a propagation of an odd delay-locked clock signal to a fourth delay logic associated with delaying commands received on the one of rising and falling edges of the odd-indexed pulses of the global clock signal, wherein a third delay logic associated with delaying commands received on the one of rising and falling edges of the even-indexed pulses of the global clock signal remains disabled during the propagation of the command through the fourth delay logic.

10. An apparatus, comprising:
a volatile memory array;
a command decoder configured to receive commands for accessing data stored in the volatile memory array;
first timing logic configured to generate an even clock signal associated with one of rising and falling edges of even-indexed pulses of a global clock signal;
second timing logic configured to generate an odd clock signal associated with one of rising and falling edges of odd-indexed pulses of the global clock signal;
first delay logic configured to use the even clock signal to delay first commands received on the one of rising and falling edges of the even-indexed pulses of the global clock signal based at least in part on a latency between receiving commands and communicating corresponding data;
second delay logic configured to use the odd clock signal to delay second commands received on the one of rising and falling edges of the odd-indexed pulses of the global clock signal based at least in part on the latency between receiving commands and communicating corresponding data; and
logic configured to enable a propagation of the even clock signal to the first delay logic or to enable a propagation of the odd clock signal to the second delay logic based at least in part on whether a corresponding command is received on one of a rising and falling edge of an even-indexed pulse of the global clock signal or a one of the rising and falling edge of an odd-indexed pulse of the global clock signal.

11. The apparatus of claim 10, wherein the logic comprises first-stage logic comprising:

a first OR gate configured to receive a first signal configured to indicate whether an even portion of the command decoder is activated and a first busy signal configured to indicate whether the first delay logic is activated and to output a first enable signal based at least in part on the first signal and the first busy signal; and a second OR gate configured to receive a second signal configured to indicate whether an odd portion of the command decoder is activated and a second busy signal configured to indicate whether the second delay logic is activated and to output a second enable signal based at least in part on the second signal and the second busy signal.

12. The apparatus of claim 11, wherein the first-stage logic comprises:
a first AND gate configured to receive the first enable signal from the first OR gate and the even clock signal and to output a first clock signal for the first delay logic based at least in part on the first enable signal and the even clock signal; and
a second AND gate configured to receive the second enable signal from the second OR gate and the odd clock signal and to output a second clock signal for the second delay logic based at least in part on the second enable signal and the odd clock signal.

13. The apparatus of claim 10, further comprising:
a delay-locked loop configured to generate an even delay-locked clock signal based at least in part on the even clock signal and an odd delay-locked clock signal based at least in part on the odd clock signal;
third delay logic configured to use the even delay-locked clock signal to delay third commands received at the delay-locked loop on the one of rising and falling edges of the even-indexed pulses of the global clock signal; and
fourth delay logic configured to use the odd delay-locked clock signal to delay fourth commands received at the delay-locked loop on the one of rising and falling edges of the odd-indexed pulses of the global clock signal.

14. The apparatus of claim 13, further comprising:
shifting logic configured to shift an alignment of commands between the even clock signal and the odd clock signal based at least in part on whether the latency between receiving commands and communicating corresponding data span an even quantity of clock cycles or an odd quantity of clock cycles, wherein the logic comprises second-stage logic configured to enable one of the even delay-locked clock signal or the odd delay-locked clock signal to propagate to a corresponding one of the third delay logic or the fourth delay logic based at least in part on whether the corresponding command is received at the delay-locked loop on the one of the rising and falling edge of the even-indexed pulse of the global clock signal or the one of the rising and falling edge of the odd-indexed pulse of the global clock signal.

15. The apparatus of claim 14, wherein the second-stage logic comprises:
second shifting logic configured to output a first enable signal if the latency between receiving commands and communicating corresponding data spans the even quantity of clock cycles and a second enable signal if the latency between receiving commands and communicating corresponding data spans the odd quantity of clock cycles.

16. The apparatus of claim 15, wherein the second-stage logic comprises:
a first OR gate configured to receive the first enable signal from the second shifting logic and a first busy signal configured to indicate whether the third delay logic is activated and to output a third enable signal based at least in part on the first enable signal and the first busy signal; and
a second OR gate configured to receive the second enable signal from the second shifting logic and a second busy signal configured to indicate whether the fourth delay logic is activated and to output a fourth enable signal based at least in part on the second enable signal and the second busy signal.

17. The apparatus of claim 16, wherein the second-stage logic comprises:
a first AND gate configured to receive the third enable signal from the first OR gate and the even delay-locked clock signal and to output a first clock signal for the third delay logic based at least in part on the third enable signal and the even delay-locked clock signal; and
a second AND gate configured to receive the fourth enable signal from the second OR gate and the odd delay-locked clock signal and to output a second clock signal for the fourth delay logic based at least in part on the fourth enable signal and the odd delay-locked clock signal.

18. An apparatus, comprising:
a memory device comprising a volatile memory array; and
a controller coupled with the volatile memory array and configured to cause the apparatus to:
receive an even clock signal associated with one of rising and falling edges of even-indexed pulses of a global clock signal and an odd clock signal associated with one of rising and falling edges of odd-indexed pulses of the global clock signal, wherein the global clock signal is associated with accessing data stored in the memory device;
receive an indication that a command for accessing data stored in the volatile memory array has been received at the memory device, wherein the indication further indicates whether the command was received on one of a rising and falling edge of an even-indexed pulse of the global clock signal;
determine, based at least in part on the indication, whether to enable a propagation of the even clock signal to a first delay logic associated with delaying commands received on the one of rising and falling edges of the even-indexed pulses of the global clock signal or to enable a propagation of the odd clock signal to a second delay logic associated with delaying commands received on the one of rising and falling edges of the odd-indexed pulses of the global clock signal; and
delay a propagation of the command using one of the first delay logic and the even clock signal or the second delay logic and the odd clock signal based at least in part on the determining.

19. The apparatus of claim 18, wherein the controller is further configured to cause the apparatus to:
generate, based at least in part on the determining, a signal for enabling one of the propagation of the even clock signal to the first delay logic or the propagation of the odd clock signal to the second delay logic based at least in part on which of the first delay logic or the second delay logic is used to delay the propagation of the command.

20. The apparatus of claim 18, wherein the controller is further configured to cause the apparatus to:
receive a second indication of whether a latency between receiving commands and communicating corresponding data spans an even quantity of clock cycles or an odd quantity of clock cycles;
determine, after the propagation of the command through one of the first delay logic or the second delay logic, whether to shift an alignment of the command between the even clock signal and the odd clock signal based at least in part on the second indication; and
generate, after determining whether to shift the alignment of the command, a third indication of whether the command is aligned with the even clock signal or the odd clock signal.

\* \* \* \* \*